United States Patent
Ishikawa et al.

(10) Patent No.: US 6,264,707 B1
(45) Date of Patent: Jul. 24, 2001

(54) ELECTRODE FOR AN ELECTRIC DOUBLE LAYER CAPACITOR AND PROCESS FOR PRODUCING IT

(75) Inventors: Takamichi Ishikawa; Satoru Kuroki; Manabu Suhara; Sadao Kanetoku, all of Kanagawa (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/238,886

(22) Filed: Jan. 28, 1999

(30) Foreign Application Priority Data

Jan. 30, 1998 (JP) .................................................. 10-019758

(51) Int. Cl.$^7$ ....................................................... H01G 9/00
(52) U.S. Cl. ........................... 29/25.03; 428/265; 264/108
(58) Field of Search ........................... 428/265; 29/25.03; 264/108

(56) References Cited

U.S. PATENT DOCUMENTS

| | | |
|---|---|---|
| 4,422,992 | 12/1983 | Michel . |
| 4,781,972 * | 11/1988 | Sakane et al. . |
| 4,862,328 | 8/1989 | Morimoto et al. . |
| 5,286,773 * | 2/1994 | Sterling et al. . |

OTHER PUBLICATIONS

Derwent Abstract, AN 93–124569, SU 1 729 773, Apr. 30, 1992.

* cited by examiner

*Primary Examiner*—David E. Graybill
(74) *Attorney, Agent, or Firm*—Oblon, Spivak, McClelland, Maier & Neustadt, P.C.

(57) ABSTRACT

A process for producing an electrode for an electric double layer capacitor, which comprises extruding a mixture comprising a carbonaceous material, a polytetrafluoroethylene and a processing aid by screw extrusion, and rolling the obtained extruded product by rolling rolls to form it into a sheet shape.

10 Claims, No Drawings

ELECTRODE FOR AN ELECTRIC DOUBLE LAYER CAPACITOR AND PROCESS FOR PRODUCING IT

The present invention relates to a process for producing an electrode for an electric double layer capacitor.

The demand for an electric double layer capacitor utilizing an electric double layer formed at the interface between a polarizable electrode and an electrolyte, particularly for a coin shaped one, is rapidly increasing recently, as a memory backup power source. On the other hand, it is desired to develop an electric double layer capacitor having a large capacitance per volume, small internal resistance, a high energy density and a high output density, also for a use which requires a large capacity such as a driving source for electric cars. Further, with regard to an electric double layer capacitor for memory backup, it is desired to reduce the internal resistance.

The electrode for an electric double layer capacitor is prepared, for example, by kneading an activated carbon powder with a solvent for an electrolytic solution such as sulfuric acid, and forming the mixture into a slurry, followed by press forming (U.S. Pat. No. 3,288,641). However, the electrode obtained by the process has a stiff porous structure and thus is likely to be cracked or broken, and it can not be used for a long period of time.

On the other hand, a carbon-based electrode has been proposed which is made of a viscous material having a binder made of a polytetrafluoroethylene (hereinafter referred to as PTFE) added to a mixture comprising an activated carbon powder and an electrolytic solution, as the case requires (JP-B-53-7025, JP-B-55-41015). The electrode has crack resistance and break resistance. However, it is inadequate in the shape keeping property, and a cell having a special structure is required to supplement the strength to use the electrode.

In order to obtain an electrode having crack resistance and break resistance, and an excellent shape keeping property, a process has been proposed, which comprises preliminarily molding a kneaded material comprising a carbonaceous material, a binder such as PTFE and a liquid lubricant, followed by stretching or rolling to obtain a formed electrode of sheet shape (JP-A-63-107011, JP-A-2-235320).

However, by this process, PTFE is randomly formed into fibers by kneading, and a part of PTFE is formed into fibers and the rest is not, and consequently the hardness of the two parts will be different. Therefore, when forming the sheet electrode into a thin film sheet having, for example, a thickness of at most 0.2 mm, the surface tends to be irregular, and holes are likely to be formed. Therefore, the capacitance per volume (hereinafter referred to as capacitance density) of the electric double layer capacitor can not be made large, and the internal resistance is large.

A process has also been proposed, which comprises mixing an activated carbon powder and PTFE to obtain a paste, coating the paste on a current collector, followed by drying, heating at a temperature higher than the melting point of PTFE, and press-forming the electrode to make it thin to increase the density (JP-A-9-36005). However, with this process, the production steps are complicated, and it is difficult to continuously conduct the process, and a part of PTFE melts so that the internal resistance will be high.

Further, by the above processes, it is difficult to prepare an elongate electrode sheet, and the electrode can not be obtained by continuous operation, whereby production efficiency is poor.

On the other hand, as a method for extruding PTFE, a paste extrusion method has been known, which comprises using a polymer (fine powder) obtained by coagulating and drying an aqueous dispersion of PTFE made by emulsion polymerization of a tetrafluoroethylene, adding a processing aid such as naphtha or white lamp oil thereto, preliminarily molding the mixture to form it into a sleeve shape and filling it to a cylinder mold, followed by pressurizing by a ram to extrude it through a nozzle suitable for a shape of a rod or a sheet, and vaporizing the processing aid to obtain a formed product (JP-B-61-54578).

This method is generally applied to molding of PTFE alone or PTFE containing several wt % of a filler, and is not applied to molding wherein a filler is the main component and PTFE is used merely as a mechanical supplement. Namely, since the filler such as graphite, glass fiber or carbon fiber is not likely to undergo plastic deformation, in a case where it is mixed with PTFE and molded, the extrusion pressure tends to be high, and PTFE is highly deformed. Therefore, there is a problem that the obtained extruded product is fragile and has low strength. Further, in the paste extrusion method, the amount extruded at a time depends on the shape of sleeve, and thus it is difficult to continuously obtain an elongate extruded product.

The present invention has been made to overcome the above-mentioned problems of the prior art, and it is an object of the present invention to provide an electrode having a shape of thin film sheet and having high strength, and a process for continuously producing the electrode, thereby to provide an electrode for an electric double layer capacitor having a high capacitance density and small internal resistance, particularly an electrode for an electric double layer capacitor suitable for use wherein a large current is required with a high capacitance.

The present invention provides a process for producing an electrode for an electric double layer capacitor, which comprises extruding a mixture comprising a carbonaceous material, a polytetrafluoroethylene and a processing aid by screw extrusion, and rolling the obtained extruded product by rolling rolls to form it into a sheet shape, and an electrode obtainable by the process.

As the carbonaceous material, a powder of e.g. activated carbon, polyacene or carbon black, which has a specific surface area of from 200 to 3500 $m^2/g$, is preferred. Further, a fiber or a powder of e.g. carbon fiber, carbon whisker or graphite can also be preferably used, so long as its specific surface area is from 200 to 3500 $m^2/g$. As the activated carbon, a phenol type, a rayon type, an acryl type, a pitch type or a coconut shell type may be used. The particle size is preferably from 0.1 to 100 $\mu m$, particularly preferably from 1 to 20 $\mu m$, whereby it is easy to form the electrode into a thin film sheet, and the capacitance density can be made high.

It is also preferred to use carbon black in admixture with another carbonaceous material, as a conductive material. The particle size of the carbon black is preferably from 0.001 to 1 $\mu m$, particularly preferably from 0.01 to 0.5 $\mu m$, and the specific surface area of the carbon black is preferably from 200 to 1500 $m^2/g$, particularly preferably from 500 to 1300 $m^2/g$. An electrode comprising the carbon black as a conductive material, activated carbon having a specific surface area of from 200 to 3500 $m^2/g$ and a particle size of from 0.1 to 100 $\mu m$, and PTFE, is preferred since the internal resistance can be kept low, and the capacitance can be kept high.

In the present invention, PTFE includes not only a homopolymer of tetrafluoroethylene but a copolymer obtained by adding at most 0.5 mol % of another monomer to tetrafluoroethylene, followed by copolymerization. When another monomer is at most 0.5 mol %, the melt fluidity is not given to PTFE, and it is possible to form the copolymer into fibers and to prepare an electrode sheet having high strength and low resistance, just like the homopolymer of tetrafluoroethylene. As another monomer, hexafluoropropylene, chlorotrifluoroethylene, perfluoro (alkyl vinyl ether), trifluoroethylene or (perfluoroalkyl) ethylene may, for example, be mentioned.

PTFE is a liquid or a gel when it is of low molecular weight, and in such a state, it can hardly be formed into fibers. Therefore, it is preferred that PTFE contains at least 50 wt % of a polymer having a molecular weight of at least $1 \times 10$ as calculated from the standard specific gravity. Further, PTFE obtained by emulsion polymerization is preferred since it is easily formed into fibers.

The processing aid of the present invention is added so that PTFE is suitably formed into fibers and undergoes plastic deformation. It is not particularly limited so long as it is a liquid capable of wetting PTFE easily, and being removed easily from the formed electrode. Specifically, a hydrocarbon such as ethanol, methanol, 2-propanol, lamp oil, solvent naphtha or white naphtha, ethylene glycol, propylene glycol, dipropylene glycol or glycerol may, for example, be mentioned. Further, a dispersion of a fluoro resin such as an aqueous dispersion of PTFE may be used as the processing aid, and it may be used alone or in combination with another processing aid. Particularly, propylene glycol or dipropylene glycol is preferably used.

In the process of the present invention, PTFE, the carbonaceous material and the processing aid are mixed so that PTFE is contained in the electrode in an amount of preferably from 1 to 50 wt %, more preferably from 5 to 30 wt %, to the carbonaceous material. Sine PTFE is contained in the electrode as a binder to keep the shape of the electrode sheet, if PTFE is less than 1 wt %, the strength tends to be low, and if PTFE is more than 50 wt %, the internal resistance of the electrode tends to increase.

In the process of the present invention, the processing aid may be added after mixing the carbonaceous material and PTFE or when mixing them. The mixture comprising the carbonaceous material, PTFE and the processing aid may be a granulated product, but it does not influence the screw extrusion. It is preferred to add from 20 to 200 wt %, particularly from 40 to 100 wt %, of the processing aid to the carbonaceous material. If the processing aid is less than 20 wt %, the pressure for extrusion tends to be high, thereby the extrusion becomes difficult. If the processing aid is more than 200 wt %, the pressure for extrusion does not increase, PTFE tends to be not adequately formed into fibers, and the processing aid is likely to exude from gaps of the mold or the cylinder, or flow backward and flow out from the opening of the hopper during extrusion.

In the process of the present invention, screw extrusion by using a screw extruder is conducted. The screw extruder has a screw having spiral grooves, rotatable in the cylinder of the extruder, and kneads the mixture comprising a carbonaceous material, PTFE and a processing aid while moving the mixture in the cylinder by rotation of the screw, and then extrudes it. In the present invention, a screw extruder for resin, for rubber or for building material can be used. Further, a monoaxial extruder or a multiaxial extruder may be used. As the shape of the screw, various shapes such as a full flight screw, a variable pitch screw and a screw equipped with a mixing pitch may be employed. A full flight screw with which the adjustment of extrusion pressure is easy, is particularly preferred.

The extrusion temperature for the screw extrusion is preferably from 5 to 300° C., particularly preferably from 30 to 150° C. If it is less than 5° C., the extruded product tends to be fragile, whereby it is difficult to keep the shape, and if it is higher than 300° C., the processing aid will significantly evaporate, whereby extrusion becomes difficult.

The extrusion pressure for the screw extrusion is preferably from 2 to 300 kg/cm$^2$, more preferably from 5 to 100 kg/cm$^2$, particularly preferably from 5 to 60 kg/cm$^2$. If it is less than 2 kg/cm$^2$, the extruded product tends to be too soft, whereby it is difficult to keep the shape, and if it is higher than 300 kg/cm$^2$, the extrusion tends to be difficult, and the obtained extruded product tends to be fragile.

The screw compression ratio in the screw extrusion is preferably from 1.0 to 4.0, particularly preferably from 1.0 to 2.0. If it is less than 1.0, PTFE is not adequately formed into a fibers, the strength of the extruded product is not adequate, whereby it is difficult to keep the shape of the electrode. If it is more than 4.0, the extrusion pressure tends to be high, whereby the extrusion becomes difficult. Here, the screw compression ratio is a value obtained by dividing the cross-sectional area between the inside of the cylinder and the groove diameter of the screw at the base of the screw, by the cross-sectional area between the inside of the cylinder and the groove diameter of the screw at the top of the screw.

In the present invention, the screw-extruded product is then rolled by rolling rolls (hereinafter referred to as rolling), to form it into a sheet shape. The thickness of the screw-extruded product becomes usually from about $\frac{1}{10}$ to about $\frac{1}{200}$ by rolling. PTFE in the extruded product by the screw extrusion is formed into fibers in the direction perpendicular to the extrusion direction. Therefore, the rolling treatment is conducted preferably in the same direction as the extrusion direction of the screw extrusion, since the forming into fibers in the extrusion direction is accelerated, PTFE is formed into fibers in both length and breadth directions to have a network structure, and the carbonaceous material is kept by the network structure, whereby the strength can be made high.

The rolling temperature for rolling is preferably from 20 to 350° C., particularly preferably from 60 to 150° C. If the rolling temperature is lower than 20° C., PTFE is less likely to be formed into fibers adequately, whereby the sheet tends to be fragile. If the rolling temperature is higher than 350° C., the processing aid will significantly evaporate, whereby cracking or separation is likely to result on the surface of the sheet. Here, the rolling temperature means the temperature of rolling rolls when the rolling rolls contact the sheet.

The sheet formed by rolling is then dried to remove the processing aid. The temperature for drying is preferably higher than the boiling point of the processing aid and lower than the melting point of PTFE. Further, it is possible to stretch the sheet-shaped product which is dried or semi-dried wherein the processing aid is partially removed. Further, it is possible to conduct rolling after stretching.

In the case of stretching, the stretching ratio is preferably from 1.01 to 5.0 times, and the stretching is conducted monoaxially or multiaxially. Further, the stretching may be conducted before the drying step. By stretching, the forming of PTFE into fibers is accelerated, and a thin film sheet having high strength and low resistance can be obtained. The temperature during stretching is preferably from 30 to 350° C., particularly preferably from 200 to 320° C., whereby the forming of PTFE into fibers can be more accelerated.

The electrode sheet obtained by the process of the present invention can be used as an electrode as it is initially formed. However, it may be used after baking, as the case requires. The baking may be complete baking at a temperature higher than the melting point of PTFE or incomplete baking at a temperature lower than the melting point of PTFE.

By the process of the present invention, an electrode sheet can be obtained, wherein PTFE is formed into fibers in both length and breadth directions to have a network structure, and the carbonaceous material is kept by the network structure of PTFE. The electrode has high strength and excellent shape keeping property, and it is easy to form the electrode into a thin film. Further, the forming of PTFE into fibers in both length and breadth directions is accelerated. Accordingly, even when the amount of PTFE is small, the electrode sheet formed into a thin film, is excellent in crack resistance, break resistance and shape keeping property.

Further, in the present invention, it is possible to conduct continuous extrusion by screw extrusion, whereby a continuous electrode which is long in extrusion direction, can be obtained. By rolling treatment of the extruded product, an elongate electrode can be obtained.

Further, since PTFE is formed into fibers and has a three-dimensional network structure, the increase of the resistance of the electrode by blending PTFE which is non electroconductive, is small. Further, forming of the three-dimensional network structure is accelerated by forming of PTFE into fibers, and thus the resistance of the electrode will further decrease. Further, in the case where the carbon black is added as a conductive material, a high pressure is exerted on carbon black in both steps of screw extrusion and rolling, whereby the electrode will have low resistance by electrical connection even with a small amount of carbon black.

With regard to the strength of the electrode sheet of the present invention, the tensile strength is preferably at least 1.5 kg/cm$^2$, particularly preferably at least 2.0 kg/cm$^2$ in at least one direction. In the process of the present invention, in a case where the electrode is produced so that the direction of screw extruding and the direction of rolling are the same, the tensile strength in one direction as described above corresponds to the tensile strength in the direction of rolling.

In the present specification, the tensile strength of an electrode is a value obtained by dividing the maximum load, when the electrode sheet is dried for an hour at a temperature of 250° C., punched to a shape of a dumbbell specimen of No. 1 as stipulated in JIS K6301, and subjected to a tensile test at a pulling rate of 20 mm/min at an atmosphere temperature of 25±2° C., by the cross-sectional area (the thickness of the electrode sheet×the width of the parallel parts).

The electrode obtained in the present invention is used for an electric double layer capacitor as an electrode assembly which is integrated with a current collector by e.g. bonding to the current collector. As the current collector, a metal foil, particularly an aluminum foil is preferred. An aluminum foil may be withdrawn from a coil made by winding an elongate foil in a shape of a roll. The electrode which is formed by the final rolling, is integrated with an aluminum foil, as soon as it is formed, from the formed portion, to conduct forming of the electrode and integration continuously on one line. When an electrode is formed by such a continuous line, production efficiency is high.

The integration of the electrode and the current collector is preferably conducted by means of an adhesive between them, since they are thereby strongly integrated. It is preferred to incorporate e.g. a highly electroconductive powder to the adhesive, since the contact resistance between the electrode and the current collector decreases. By rolling after bonding of the electrode and the current collector, they are more strongly integrated. It is possible to conduct bonding after the processing aid is removed by drying after forming. However, it is preferred to bond the electrode in a semi-dried condition with the current collector, conduct rolling, and then remove the processing aid, as it is thereby easy to integrate the electrode and the current collector by rolling.

Now, the present invention will be described in further detail with reference to Examples. However, it should be understood that the present invention is by no means restricted to such specific Examples.

EXAMPLE 1

To a mixture comprising 80 wt % of a high purity activated carbon powder having a specific surface area of 1500 m$^2$/g and an average particle size of 10 μm, 10 wt % of carbon black, and 10 wt % of PTFE powder, propylene glycol was added in an amount of 66 wt % based on the total amount of the activated carbon powder and carbon black, followed by mixing. The mixture was extruded by screw extrusion, by using a monoaxial extruder comprising a cylinder having an inner diameter of 40 mm, a full flight screw having a screw compression ratio of 1.6, and a nozzle designed so that the shape of the extruded product would be cylindrical (outer diameter: 102 mm, inner diameter: 86 mm), at a cylinder temperature of 80° C. and a nozzle temperature of 90° C. The extrusion pressure was 20 kg/cm$^2$.

The obtained cylindrical extruded product was cut in the longitudinal direction of the cylinder (extrusion direction), then opened and made flat. Then, it was rolled in the same direction as extrusion direction at a rolling temperature of 80° C., followed by drying at a temperature of 250° C. for 60 minutes to remove propylene glycol, and a sheet having a thickness of 120 am was formed.

The sheet was dried at a temperature of 250° C. for one hour, punched into a shape of a dumbbell specimen of No. 1 form as stipulated in JIS K6301, and subjected to a tensile test at a pulling rate of 20 mm/min at an atmospheric temperature of 25° C. to measure the maximum load. The measurement was repeated three times, and the average value was taken as the maximum load applied to the sheet. In order to measure the tensile strength of the sheet in the direction of rolling, the dumbbell specimen was punched so that the longitudinal direction was the direction of rolling. The tensile strength of the sheet calculated from the value of the maximum load was 8.7 kg/cm$^2$.

To one side of a pure aluminum foil having a rectangular shape with a width of 4 cm and a length of 6 cm, and a thickness of 50 μm, and having a lead terminal, an electrode sheet obtained by punching the above sheet into an area of 4 cm×6 cm, was bonded by means of a conductive adhesive, followed by heat curing of the adhesive to obtain an electrode assembly. Two sheets of such electrode assemblies were prepared, and arranged so that the electrode sides of the electrode assemblies were faced each other. A glass fiber separator having a thickness of 40 μm was interposed between the electrode assemblies, which were then sandwiched between two glass plates having a thickness of 2 mm, a width of 5 cm and a length of 7 cm, to obtain an element. The total thickness of the two electrode assemblies and the separator was 0.39 mm.

As an electrolytic solution, a solution having 1.5 mol/l of triethylmonomethylammonium tetrafluoroborate dissolved in propylene carbonate, was used. The element was subjected to vacuum heating for 3 hours at a temperature of 200° C., to remove impurities such as water from the element, and then it was impregnated with the electrolytic solution under vacuum and then accommodated in a polypropylene rectangular bottomed cylindrical container, to obtain an electric double layer capacitor. The direct current resistance and the capacitance were measured at a current density of 20 mA/cm$^2$, and the capacitance per volume (capacitance density) and volume resistance were calculated. The results are shown in Table 1.

EXAMPLE 2

A sheet was prepared in the same manner as in Example 1, except that the thickness was made to be 70 μm by rolling by rolling rolls. The tensile strength of the sheet in the direction of rolling was measured in the same manner as in Example 1 and found to be 1.6 kg/cm$^2$. An electric double layer capacitor was prepared in the same manner as in Example 1, except that an electrode sheet obtained from the sheet was used, and the same evaluation as in Example 1 was conducted. The results are shown in Table 1.

EXAMPLE 3

A sheet was prepared in the same manner as in Example 1, except that the thickness was made to be 150 μm by rolling by rolling rolls, the processing aid was dried, and stretching was conducted under a stretching ratio of 1.5 times at a temperature of 300° C. to make the thickness to be 110 μm. The tensile strength of the sheet in the direction of rolling by rolling rolls was measured in the same manner as in Example 1 and found to be 9.0 kg/cm$^2$. An electric double layer capacitor was prepared in the same manner as in Example 1, except that an electrode sheet obtained from the sheet was used, and the same evaluation as in Example 1 was conducted. The results are shown in Table 1.

EXAMPLE 4

A sheet having a thickness of 90 μm was obtained in the same manner as in Example 1, except that dipropylene glycol was added in an amount of 61 wt % based on the carbonaceous material instead of propylene glycol, followed by mixing. When preparing the sheet, the extrusion pressure in screw extrusion was 34 kg/cm$^2$. The tensile strength of the sheet in the direction of rolling by rolling rolls was 11.4 kg/cm$^2$, and the handling was easy as compared with the electrode sheet of Example 1. An electric double layer capacitor was prepared in the same manner as in Example 1, except that an electrode sheet obtained from the sheet was used, and the same evaluation as in Example 1 was conducted. The results are shown in Table 1.

EXAMPLE 5 (COMPARATIVE EXAMPLE)

A sheet was prepared in the same manner as in Example 1, except that forming was carried out by roll kneading without conducting screw extrusion, then rolling by rolling rolls was repeated 5 times to make the thickness to be 200 μm. The tensile strength of the sheet in the direction of rolling was measured in the same manner as in Example 1 and found to be 1.0 kg/cm$^2$. An electric double layer capacitor was prepared in the same manner as in Example 1, except that an electrode sheet obtained from the sheet was used, and the same evaluation as in Example 1 was conducted. The results are shown in Table 1.

EXAMPLE 6 (COMPARATIVE EXAMPLE)

A sheet having a thickness of 130 μm was obtained in the same manner as in Example 1, except that forming was carried out by roll kneading without conducting screw extrusion, and then rolling by rolling rolls was repeated 10 times. However, many holes were formed in the sheet, and the sheet could not be used as an electrode.

TABLE 1

|  | Thickness (μm) | Internal resistance (Ω) | Capacitance (F) | Volume (cm$^3$) | Capacitance density (F/cm$^3$) | Volume resistance (Ω/cm$^3$) |
| --- | --- | --- | --- | --- | --- | --- |
| Example 1 | 120 | 0.27 | 10.0 | 0.94 | 10.7 | 0.25 |
| Example 2 | 70 | 0.25 | 5.8 | 0.70 | 8.4 | 0.18 |
| Example 3 | 110 | 0.30 | 11.9 | 0.89 | 13.4 | 0.27 |
| Example 4 | 90 | 0.26 | 8.1 | 0.79 | 9.0 | 0.22 |
| Example 5 | 200 | 0.73 | 12.5 | 1.32 | 9.5 | 0.96 |

The electrode obtained by the process of the present invention has low resistance and high strength and is easily formed into a thin film, since PTFE is formed into fibers in both length and breadth directions to have a three-dimensional network structure. The electrode sheet is not likely to be cracked or broken even when it is a thin film, and it is excellent in shape keeping property Further, it is possible to obtain an elongate product by a continuous operation. Further, when carbon black is contained as a conductive material, as high pressure is put on carbon black, the electrode sheet becomes to have low resistance by electrical connection, even when the amount of carbon black is small.

Therefore, the electric double layer capacitor having the electrode produced by the process of the present invention, has small internal resistance and large capacitance per volume.

What is claimed is:

1. A process for producing an electrode for an electric double layer capacitor, which comprises extruding a mixture comprising a carbonaceous material, a polytetrafluoroethylene and a processing aid by screw extrusion, and rolling the obtained extruded product by rolling rolls to form it into a sheet shape wherein the extruded product is rolled by rolling rolls in the same direction as the screw extrusion direction.

2. The process for producing an electrode for an electric double layer capacitor according to claim 1, wherein the mixture contains from 1 to 50 wt % of the polytetrafluoroethylene and from 20 to 200 wt % of the processing aid, based on the carbonaceous material.

3. The process for producing an electrode for an electric double layer capacitor according to claim 1, wherein the extrusion temperature for the screw extrusion is from 5 to 300° C.

4. The process for producing an electrode for an electric double layer capacitor according to claim 1, wherein the extrusion pressure for the screw extrusion is from 2 to 300 kg/cm$^2$.

5. The process for producing an electrode for an electric double layer capacitor according to claim 1, wherein the compression ratio in the screw extrusion is from 1.0 to 4.0.

6. The process for producing an electrode for an electric double layer capacitor according to claim 1, wherein the rolling temperature is from 20 to 350° C.

7. The process for producing an electrode for an electric double layer capacitor according to claim 1, wherein after rolling the extruded product by rolling rolls to form it into a sheet shape, the formed product of sheet shape is monoaxially or multiaxially stretched from 1.01 to 5.0 times the original length and further rolled by rolling rolls.

8. The process for producing an electrode for an electric double layer capacitor according to claim 1, wherein the carbonaceous material comprises an activated carbon having a specific surface area of from 200 to 3,500 $m^2/g$ and a particle size of from 0.1 to 100 $\mu$m, and a carbon black having a specific surface area of from 200 to 1,500 $m^2/g$ and a particle size of from 0.001 to 1 $\mu$m.

9. A process for producing an electrode for an electric double layer capacitor, which comprises extruding a mixture comprising a carbonaceous material, a polytetrafluoroethylene and a processing aid by screw extrusion, and rolling the obtained extruded product by rolling rolls to form it into a sheet shape wherein as soon as the electrode is formed into a sheet shape by rolling by rolling rolls, it is continuously bonded and integrated with a current collector made of an aluminum foil.

10. The process for producing an electrode for an electric double layer capacitor according to claim 9, wherein the electrode and the aluminum foil are bonded by means of an electroconductive adhesive, and the electrode and the aluminum foil bonded are rolled by rolling rolls.

* * * * *